US010583503B2

(12) United States Patent
Buta et al.

(10) Patent No.: US 10,583,503 B2
(45) Date of Patent: Mar. 10, 2020

(54) PLUNGE SLITTING WITH ENHANCED SCRAP THREADING CAPABILITY USING NOTCHING SHEARS (71) Applicant: BUTECH, INC., Salem, OH (US)

(72) Inventors: John R. Buta, Salem, OH (US); Jason Cuff, Columbiana, OH (US)

(73) Assignee: Butech Bliss, Salem, OH (US)

(*) Notice: Subject to any disclaimer, the term of this patent is extended or adjusted under 35 U.S.C. 154(b) by 65 days.

(21) Appl. No.: 15/868,171

(22) Filed: Jan. 11, 2018

(65) Prior Publication Data

US 2018/0200809 A1 Jul. 19, 2018

Related U.S. Application Data (60) Provisional application No. 62/447,523, filed on Jan. 18, 2017.

(51) Int. Cl.
B23D 31/02 (2006.01)
B23D 31/00 (2006.01)
B23D 35/00 (2006.01)
B23D 19/06 (2006.01)
B21C 47/26 (2006.01)
B21C 47/00 (2006.01)
B21B 15/00 (2006.01)

(52) U.S. Cl.
CPC ............ B23D 31/02 (2013.01); B21C 47/006 (2013.01); B21C 47/267 (2013.01); B23D 19/06 (2013.01); B23D 31/008 (2013.01); B23D 35/007 (2013.01); B21B 2015/0021 (2013.01); B65H 2301/4148 (2013.01); B65H 2701/173 (2013.01)

(58) Field of Classification Search
CPC ........ B23D 31/02; B23D 19/06; B23D 3/007; B23D 31/008; B21C 47/006; B21C 47/267; B21B 2015/0021; B65H 2701/173; B65H 2301/4148; B65B 59/00; B65B 61/06; B26D 9/00; G09F 3/01; Y10S 83/917; Y10T 83/0267; Y10T 83/4473; Y10T 156/1052; Y10T 83/477; Y10T 83/0378; Y10T 83/0207
USPC ......... 83/864, 862, 214, 917, 870, 885, 213, 83/946, 30; 156/193, 250, 153, 211, 152, 156/252, 253, 268, 289, 510; 493/56, 493/199, 299, 361
See application file for complete search history.

(56) References Cited

U.S. PATENT DOCUMENTS 3,782,233 A * 1/1974 Helm ................. B26D 3/14
                                                                83/356.3
3,844,201 A * 10/1974 Eggert .................... B26D 9/00
                                                                493/355

(Continued)

FOREIGN PATENT DOCUMENTS

EP         1 997 596 A1    12/2008

Primary Examiner — Ghassem Alie
(74) Attorney, Agent, or Firm — Fay Sharpe LLP; James E. Scarbrough (57) ABSTRACT A slitting machine for threading scrap material includes first and second arbors; rotary knives disposed on each of the first and second arbors; and a pair of notching modules positioned on opposite ends of the first and second arbors. The notching modules each has a pair of shear knives for making multiple cuts in a strip of material passing through the slitting machine forming notches to enable threading of material to scrap chutes from the slitting machine.

14 Claims, 7 Drawing Sheets (56) References Cited

U.S. PATENT DOCUMENTS

| | | | | |
|---|---|---|---|---|
| 3,866,522 | A | * | 2/1975 | Oswalt, Jr. ............. B21D 22/00 |
| | | | | 72/324 |
| 3,958,051 | A | * | 5/1976 | Smith ..................... B26D 9/00 |
| | | | | 428/42.3 |
| 4,155,238 | A | | 5/1979 | Rogers |
| 4,214,024 | A | * | 7/1980 | Jacobson ............... B31D 1/021 |
| | | | | 156/253 |
| 4,442,742 | A | * | 4/1984 | Orlow .................... B26D 1/626 |
| | | | | 83/303 |
| 4,614,101 | A | | 9/1986 | Fornataro |
| 4,751,838 | A | | 6/1988 | Voges |
| 4,887,502 | A | | 12/1989 | Voges |
| 5,000,812 | A | | 3/1991 | Murphy |
| 5,365,813 | A | * | 11/1994 | Greene ................. B21D 53/74 |
| | | | | 83/35 |
| 5,575,186 | A | * | 11/1996 | Kempen .................... B21J 7/46 |
| | | | | 100/257 |
| 5,596,918 | A | * | 1/1997 | Longwell ............. B23D 35/008 |
| | | | | 493/365 |
| 5,755,131 | A | | 5/1998 | Voth |
| 6,092,709 | A | | 7/2000 | Schoenbeck et al. |
| 6,435,352 | B1 | | 8/2002 | Schoenbeck et al. |
| 6,640,684 | B2 | * | 11/2003 | Betti ....................... B65B 59/00 |
| | | | | 156/193 |
| 6,715,393 | B2 | | 4/2004 | Esenther |
| 6,857,350 | B1 | | 2/2005 | Liefer et al. |
| 6,908,020 | B2 | | 6/2005 | Gravert |
| 6,942,444 | B2 | | 9/2005 | Schoenbeck |
| 7,185,519 | B2 | | 3/2007 | Clark |
| 7,461,529 | B2 | | 9/2008 | Clark |
| 8,028,557 | B2 | | 10/2011 | Voth |
| 8,267,847 | B2 | | 9/2012 | Cummings et al. |
| 8,375,754 | B2 | | 2/2013 | Clark et al. |
| 8,783,081 | B2 | | 7/2014 | Voth et al. |
| 8,813,622 | B2 | | 8/2014 | Schoenbeck |
| 8,893,537 | B2 | | 11/2014 | Cox, III |
| 8,997,539 | B2 | | 4/2015 | Clark et al. |
| 9,021,844 | B2 | | 5/2015 | Smith et al. |
| 9,050,638 | B2 | | 6/2015 | Smith et al. |
| 9,399,246 | B2 | | 7/2016 | Clark et al. |
| 2008/0295664 | A1 | | 12/2008 | Stolyar et al. |
| 2013/0205966 | A1 | * | 8/2013 | Schoenbeck ......... B23D 35/004 |
| | | | | 83/113 |
| 2015/0217358 | A1 | | 8/2015 | Störmer et al. |
| 2016/0339593 | A1 | | 11/2016 | Matsunaga |
| 2017/0023303 | A1 | | 1/2017 | Boguslawsky et al. |
| 2017/0052149 | A1 | | 2/2017 | Aura et al. |

* cited by examiner

FIG. 1
(EXISTING)

PLUNGE SLITTING WITH ENHANCED SCRAP THREADING CAPABILITY USING NOTCHING SHEARS

CLAIM OF PRIORITY

This application claims priority from provisional application Ser. No. 62/447,523, filed on Jan. 18, 2017, the entirety of which is hereby incorporated by reference herein.

BACKGROUND OF THE DISCLOSURE

In processing metal coils, both ferrous and non-ferrous, slitting lines are used to reduce the width of an incoming coil by cutting it into a series of narrow coils. At the entry end of the line a coil is mounted on a mandrel and unwound. The unwound material is referred to as "strip". The leading edge of the strip is passed through a slitting machine that slices the strip longitudinally into multiple widths (these portions are often referred to as "mults") that are then rewound on a recoiling mandrel. The mults are then discharged and dealt with as individual narrow coils. The number of mults can vary from as little as two to as many as thirty or more.

Figure 1:
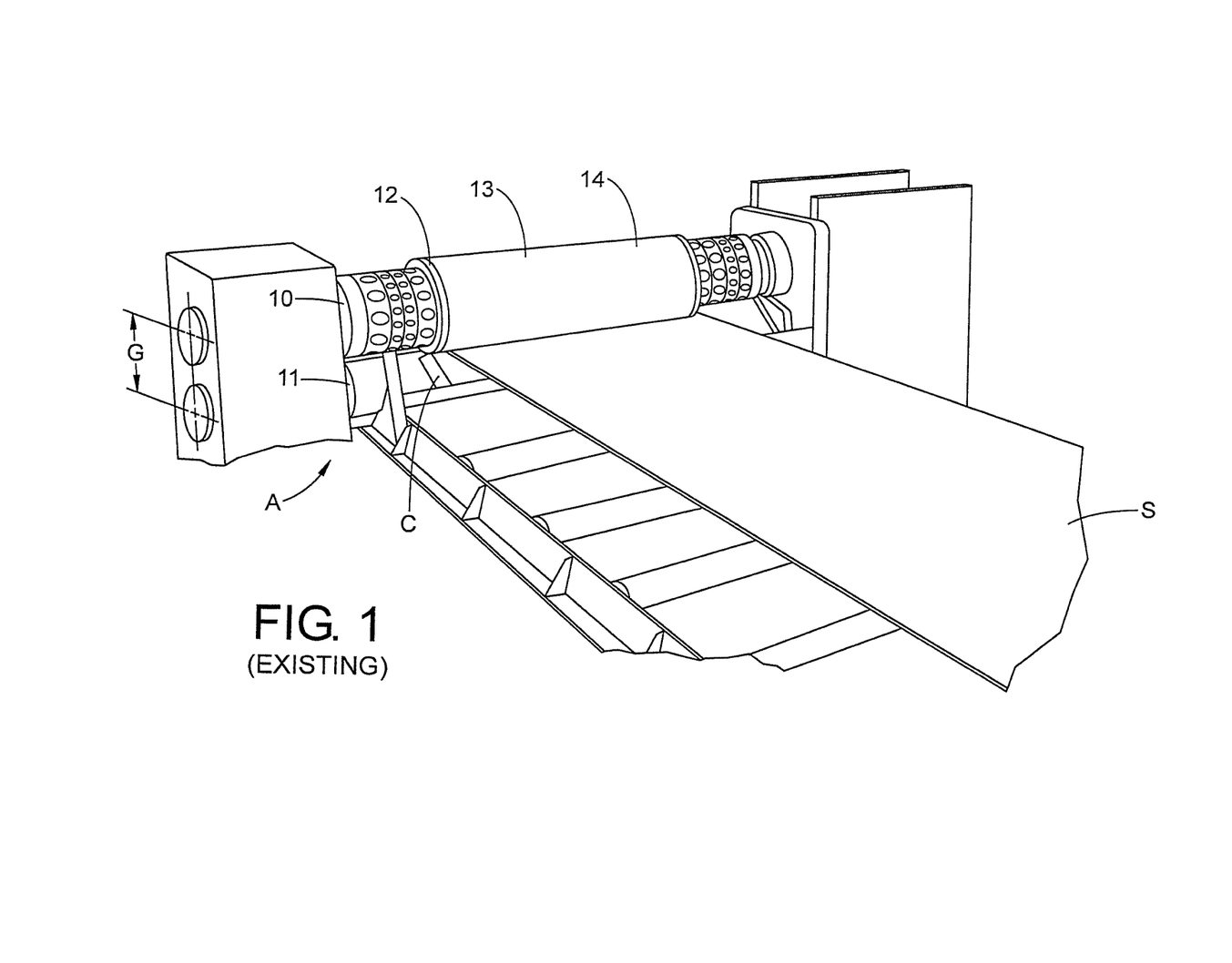
FIG. 1 is a perspective view of an existing dual arbor slitter.

Referring now to FIG. 1, a typical slitting machine A is shown which includes a pair of parallel arbors 10, 11 that are tooled with rotary knives 12. The knives are typically hardened steel discs, having a bore that corresponds to the arbor diameter. The knives are mounted by sliding them onto the arbor face and then spacers 13 are slid onto the arbor between adjacent knives. On a given arbor, the distance between adjacent knives establishes the width of the mult that will be produced in that zone. There is a longitudinal key (not shown) that engages the knives and also a slot in the arbor. The key serves as a way of transmitting the power (i.e., torque) from the arbor to the knives.

The upper and lower arbors 10, 11 are tooled with the same spacing between adjacent knives but the arrangement is such that the upper knives versus the lower knives are offset to each other by essentially the width of a knife. As seen in FIG. 1, all the knives 12 can be the same diameter and width. The spacers 13 between the knives can have additional "rubbers" or rubber sleeves 14 slid over the outer diameter of the spacers. The rubber sleeves 14 serve as strippers that keep the mults from wrapping themselves around the flanks of the knives. The rubber sleeves are essentially the same diameter as the outer diameter (OD) of the knives themselves. Scrap chute C is shown below the slitter knives where trim falls into the scrap chute.

In a parallel fashion, one of the arbors 10, 11 is adjustable relative to the other arbor such that the vertical gap between the knives can be adjusted. Typically to make a cut, the vertical gap between the upper and lower arbors has to be adjusted just right. If the gap is too wide, the strip S will not be cut. If the gap is too small, it may result in poor cut quality (i.e., bad edges). When the strip is "cut" the cut zone includes a zone of penetration and a zone of fracture through the thickness of the strip. The amount of penetration (i.e., knife gap) required to cause the fracture, depends on strip material properties.

When the strip is cut into mults, the leading edge of the strip can cause issues with threading the leading edge through the rest of the line downstream of the slitter.

For example, the individual mult leading edges want to curl up and down, each adjacent mult curls in the opposite direction of its neighbor, thus requiring special handling during the threading of the line.

To avoid this situation, it has become common practice for operators to vary the gap between the slitting arbors. When the leading edge of the strip presents itself to the slitting machine, the gap between the upper and lower knives is adjusted too wide to effect the cut. After the leading edge is through the slitter, one of the slitter arbors is adjusted to close the gap between the upper and lower knives to a point where the material is "cut". This technique leaves the leading edge of the strip with a length that is uncut and essentially one whole width of material thus making it much easier to thread the line. Once the line is threaded and the leading edge is close to the recoiler, the leading edge "uncut" zone is sheared off. This entire operator practice is often referred to as "plunge" slitting.

Plunge slitting is an improvement in threading the line, but it is an imperfect solution. The purpose of the present disclosure is to further improve the threading of slitting lines. In the process of slitting, in addition to the mults, the slitter also trims the outside edges (two edges) of the parent coil. This edge trimming accomplishes two things: 1) it establishes an exact width for the outermost two mults (one on each edge of the coil); and 2) it trims away bad edges from each edge of the parent coil (examples of bad edges or edges which could have cracks or could have material handling damage from prior handling of the parent coil).

Each edge trim includes a relatively narrow ribbon of scrap material. The scrap is removed from the line just downstream of the slitter. The two ribbons of scrap can be chopped into discrete scrap pieces (such was discussed in U.S. Pat. No. 7,901,271 related to scrap choppers which is hereby incorporated by reference in its entirety) or the scrap could be wound onto scrap winders.

When operators use plunge slitting, the leading edge of the strip remains uncut and includes the "scrap" edges. This requires the operator to stop the line and enter the line to physically and manually cut the scrap away from the uncut zone thus allowing the scrap to be redirected to the scrap chopper chutes or to scrap winders. This practice reduces productivity and introduces an unsafe condition for the operator.

Typically a slitting line would not have notchers. Normal use of notchers are on "coil to coil" lines where the tail of an exiting coil is welded or stitched to the head of an incoming coil. The notches are cut in the weld or stitch zone so that the weld or stitch could be tracked as it goes through the process line (such as a continuous pickle line for example). Tracking the weld or stitch zone allows pinch rolls and like equipment to partially open to pass the weld or stitch zone and close back. Notchers are also used to cut test samples out of the strip such as on a coil to coil line.

However, existing slitting lines do not use notches to reduce the width of its leading end of the strip which enables the trimmed scrap edges to not foul as the scrap chutes near the exit of the slitter.

Plunge slitting without the use of notches would result in the leading edge of the strip crashing against the scrap chutes.

Thus, there is a need for a method of improving the threading of slitting lines including the addition of notches which overcomes the above mentioned deficiencies while providing better overall results.

SUMMARY OF THE DISCLOSURE

The present disclosure relates to plunge slitting. More particularly, it relates to plunge slitting with improved scrap threading capability by adding and using notching shears. In accordance with one embodiment of the disclosure, a slitter and scrap chopper arrangement has knives of the same diameter while stripper rubber sleeves are positioned on spacers between the knives.

In accordance with a preferred embodiment of the disclosure, a slitting machine for threading scrap material includes first and second arbors; rotary knives disposed on each of the first and second arbors; a pair of notching modules positioned on opposite ends of the first and second arbors; the notching modules each includes a pair of shear knives for making multiple cuts in a strip of material passing through the slitting machine.

In accordance with another aspect of the disclosure, a method of using notching modules with a slitting machine includes providing a slitting machine for threading a strip of material having first and second arbors; providing rotary knives disposed on each of first and second arbors; providing a pair of notching modules positioned on opposite ends of the first and second arbors; providing a pair of shear knives for each of the notching modules; making multiple cuts in a strip of material passing through the slitting machine with the shear knives; and forming a notch in the strip of material with a first cut parallel to strip travel and a second cut perpendicular to strip travel.

According to the preferred embodiment of the disclosure, notcher modules are used to reduce the width of the leading end of the strip, which allows the leading end to be not slit until the slitter arbors are closed to their final position, at some point in the notched zone.

Another aspect of the disclosure is to prevent the two trimmed scrap edges from fouling on the scrap chutes that are close coupled to the exit side of the slitter. In any slitting line, scrap chopper chutes need to be close coupled to the exit of the slitter arbors otherwise the scrap system is not self-threading.

In accordance with another aspect of the disclosure, the slitter arbors close while the strip is moving. This relates to the ratio of the rate of arbor closure vs. strip travel and is can be implemented as an automatic sequence controlled by the operator.

In accordance with another embodiment of the disclosure, notching shear modules are positioned axially based on the width of the incoming strip just ahead of the slitter arbors.

In accordance with another embodiment of the disclosure, each notching module has a pair of notching shear knives which preferably have three sides, two of which have cutting edges for making a two sided cut; one cut is substantially parallel to the direction of strip travel of the strip while the other cut is relatively perpendicular to strip travel resulting in each notching shear module also cutting into its respective outermost mult.

In accordance with another embodiment of the disclosure, during plunge slitting, when the leading edge of the strip is threaded into the nip of the slitter arbors, the slitter knife gap is too large to cut the strip into mults; and the leading edge (for example the first 12 inches of strip) has a reduced width as reduced by the two notches. Because the leading edge of the strip is narrower, and as the strip is advanced past the scrap chutes (that are immediately downstream of the slitter arbors) there is no fouling of the strip edges on the scrap chutes.

When the leading edge of the strip is at the nip of the slitter arbors, the arbor gap is commanded to close at a predetermined rate while the strip advances (continues to feed past the slitter) at an appropriate line speed, such that by the time the notch zone trailing edge is near the nip of the slitter arbors, the slitter arbor vertical gap has closed to a point where the knife vertical gap is tight enough to cut through the strip. This can be a fully automated sequence or can be manual with the operator controlling the sequence. The key is the timing between the vertical closure of the arbors and the speed of advance of the strip.

As the arbor gap closes it is important for the strip to be advancing otherwise the separating force between the arbors would get quite large and possibly overload the slitter arbor bearings.

In accordance with still another embodiment of the disclosure, strip material is fed into the line and the slitter arbor gap is preset too large to make the cut (i.e., during initial threading through the slitter). When the leading edge of the strip is at the notching shears (which are located several feet upstream of the slitter), the notching shears are engaged and each shear cuts the edge trim for each edge. This can be done as a single cut or several cuts can be made in succession to create a relatively long reduced width at the leading end of the strip. Typically the notching will have been completed prior to the leading strip edge advancing far enough to be at the slitter. Generally it is desirable to keep the notched length short; this to reduce waste of material. As the strip advances to the slitter, the slitter arbors are closed further at a closure speed that is appropriate to the strip advance speed. When strip has advanced far enough and slitter arbors are at their final cutting gap the strip will be cut all the way through and the strip width will be at the unnotched width, which results in each edge have a trim width that will 'automatically" thread itself into the scrap chutes and on into the scrap choppers or down to scrap winders.

Other aspects of the disclosure will become apparent upon a reading and understanding of the following detailed description.

DETAILED DESCRIPTION OF THE DISCLOSURE

The present disclosure relates to plunge slitting. More particularly, it relates to plunge slitting with improved scrap threading capability by using notching shears. Specifically, the present disclosure is shown in FIGS. 2-6. Each edge trim includes a relatively narrow ribbon of scrap material. The scrap is removed from the line just downstream of the slitter.

Figure 2:
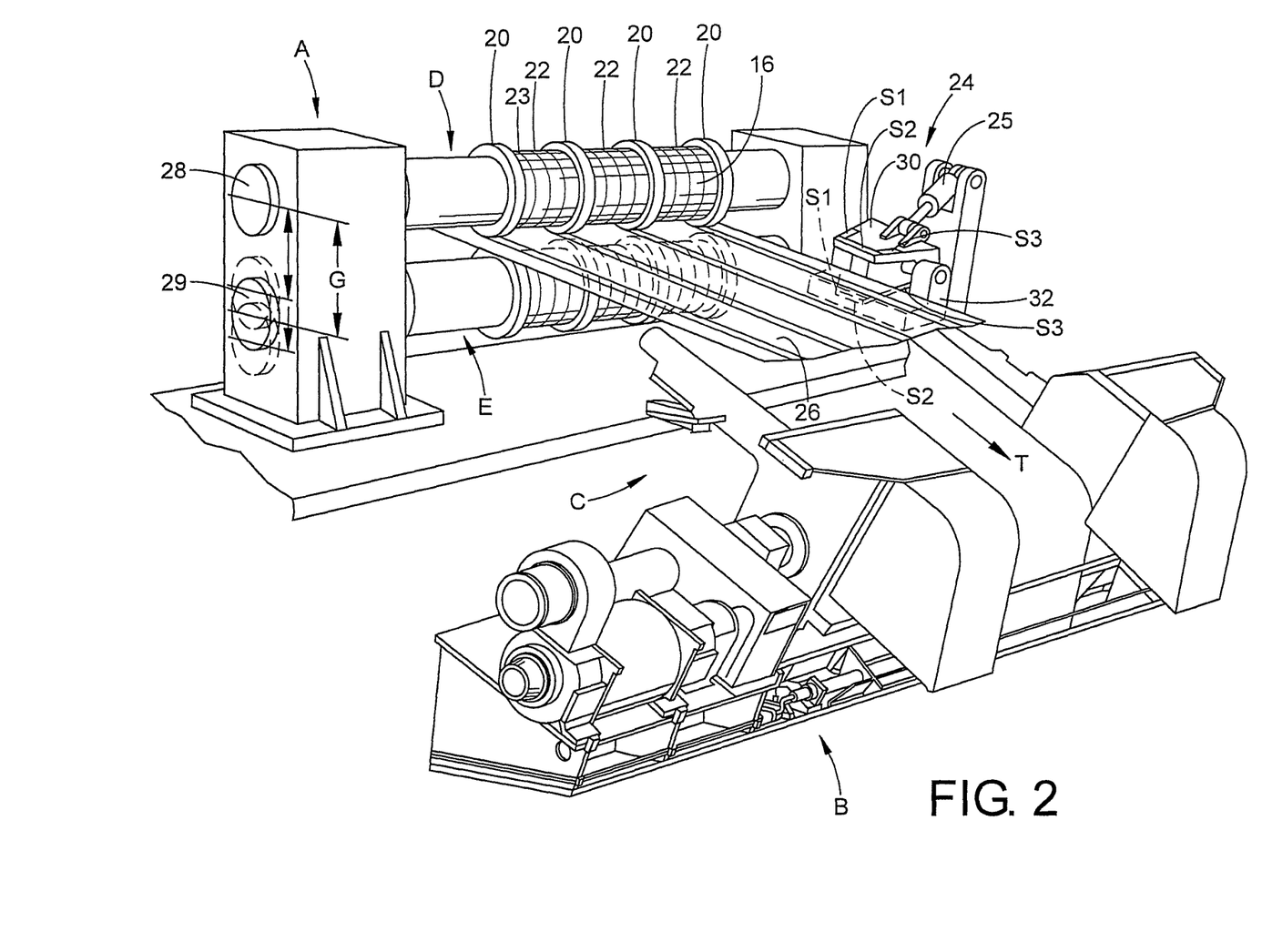
FIG. 2 is a perspective view of a slitter with notching modules and a downstream scrap chopper in accordance with a preferred embodiment of the disclosure.

Referring now to FIG. 2 scrap choppers B and chutes C can be positioned immediately after slitter arbors D and E.

FIG. 2 shows that the lower slit arbor E can be adjustable upwardly and downwardly to adjust the arbor gap G.

Figure 5A:
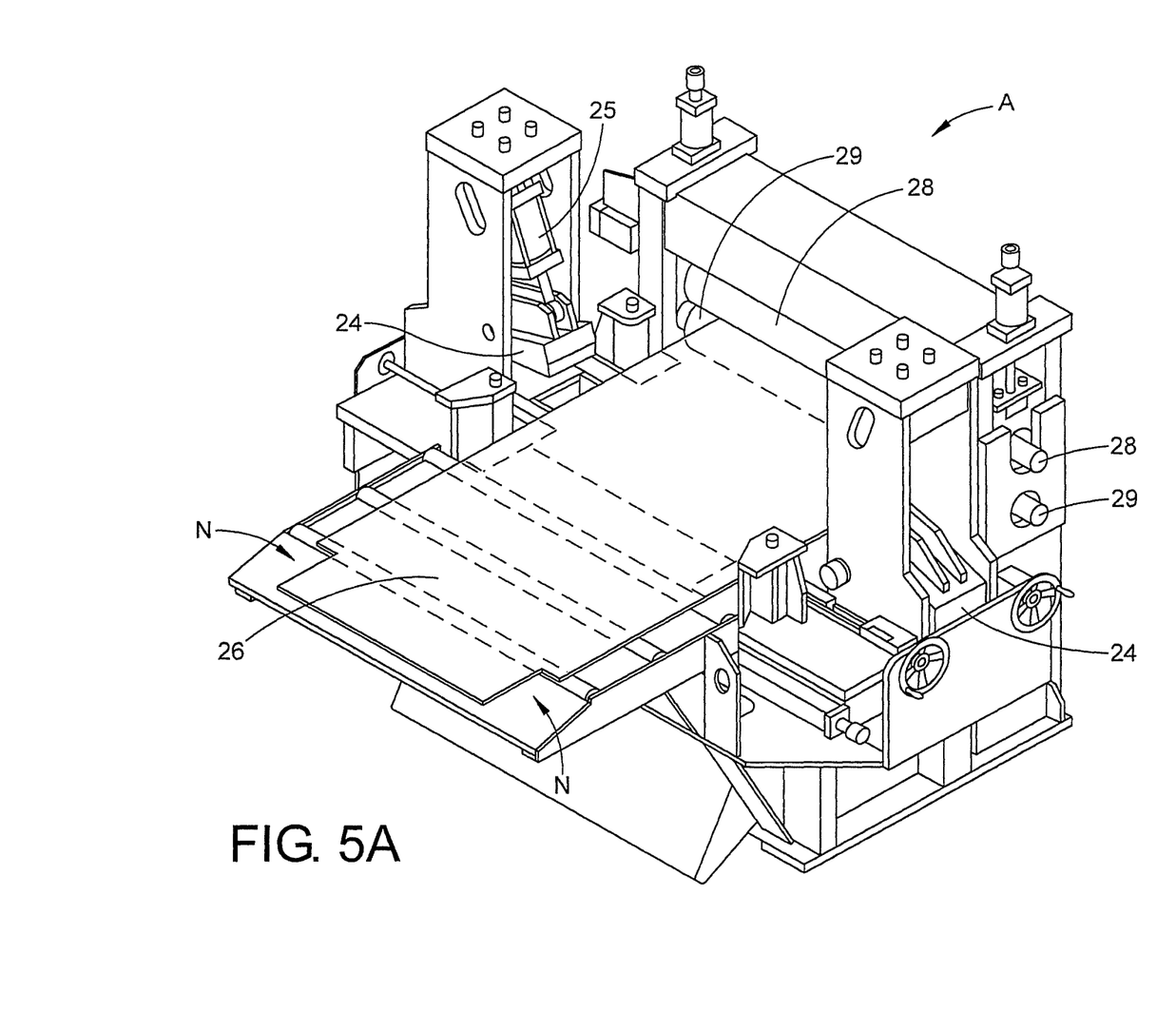
FIG. 5A is a perspective view of a notcher machine assembly in accordance with a preferred embodiment of the disclosure.
Figure 5B:
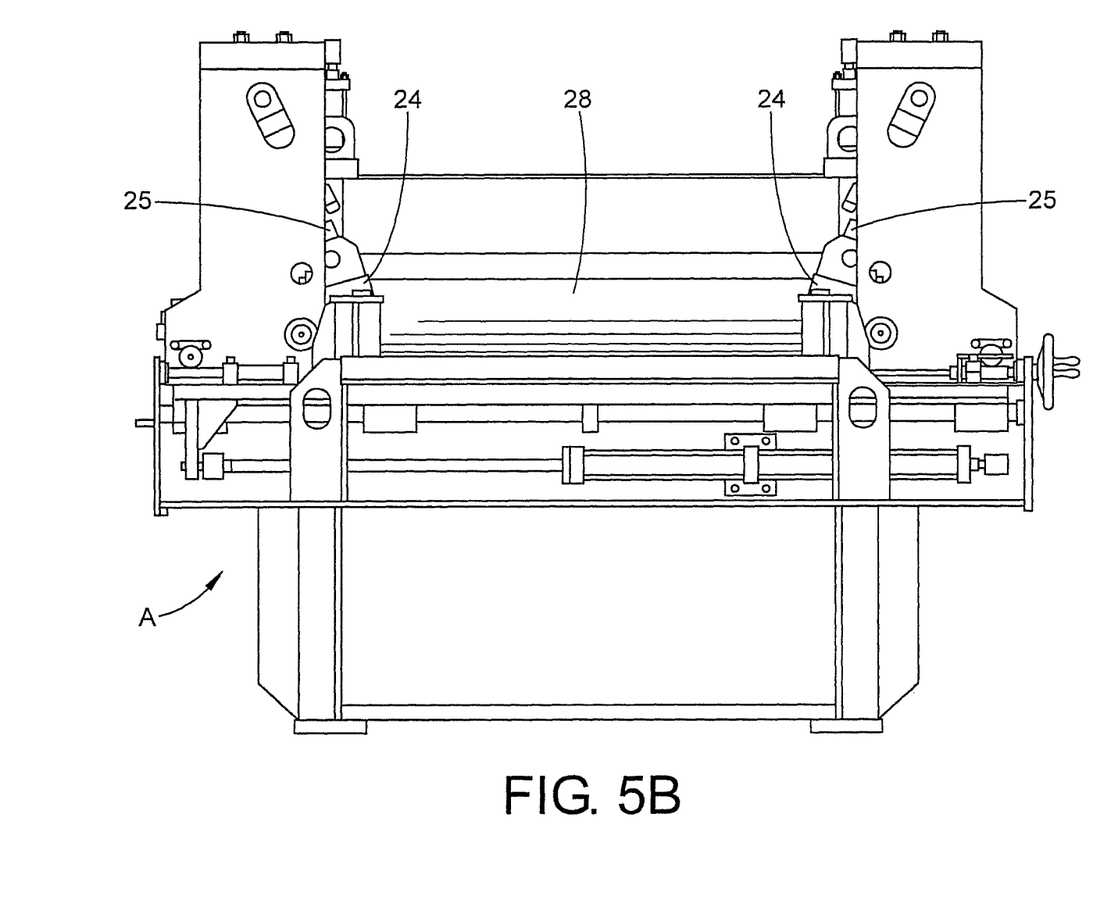
FIG. 5B is a front elevational view of the notching assembly of FIG. 5A.

Referring to FIGS. 2, 5A and 5B, a slitter A and scrap chopper B and chute C arrangement are shown. The slitter, notching module and choppers are shown separately for clarity. The scrap chopper B is shown to illustrate the problem of how to get the scrap trim into the chopper where the first two feet of strip is not cut through. The same problem exists regardless whether a scrap chopper or scrap winder is used. All of the knives 20 on the arbors 28, 29 are of the same diameter while stripper rubber sleeves 22 are positioned on spacers 16 between the knives.

Mounted on opposite sides of the slitter arbor assemblies 28, 29, are notching shear modules 24 (only one is shown on the right side for clarity). The modules 24 are hydraulically operated by a hydraulic motor 25. Each notching module is positioned axially on opposite sides of the strip based on the width of the incoming strip 26 and the position of the strip relative to the centerline of the process line. In slitting lines the strip can run down the center or on narrower strip it is common practice to run the strip favoring the drive side of the line or the operators side of the line as this results in less slitter arbor deflection; thus a heavier cut schedule can be realized.

Each notching module 24 has a pair of notching upper and lower shear knives 30, 32. This style of knife has three sides S1, S2, S3 and makes a two sided cut; that is, one cut made by side S2 is substantially parallel to the director of strip travel T of strip 26 and the other cut made by side S1, is relatively perpendicular to strip travel. The positioning of each notching module 24 is such that the cut that is parallel to strip travel cuts the strip inboard of the cutting plane of the trim.

Figure 3:
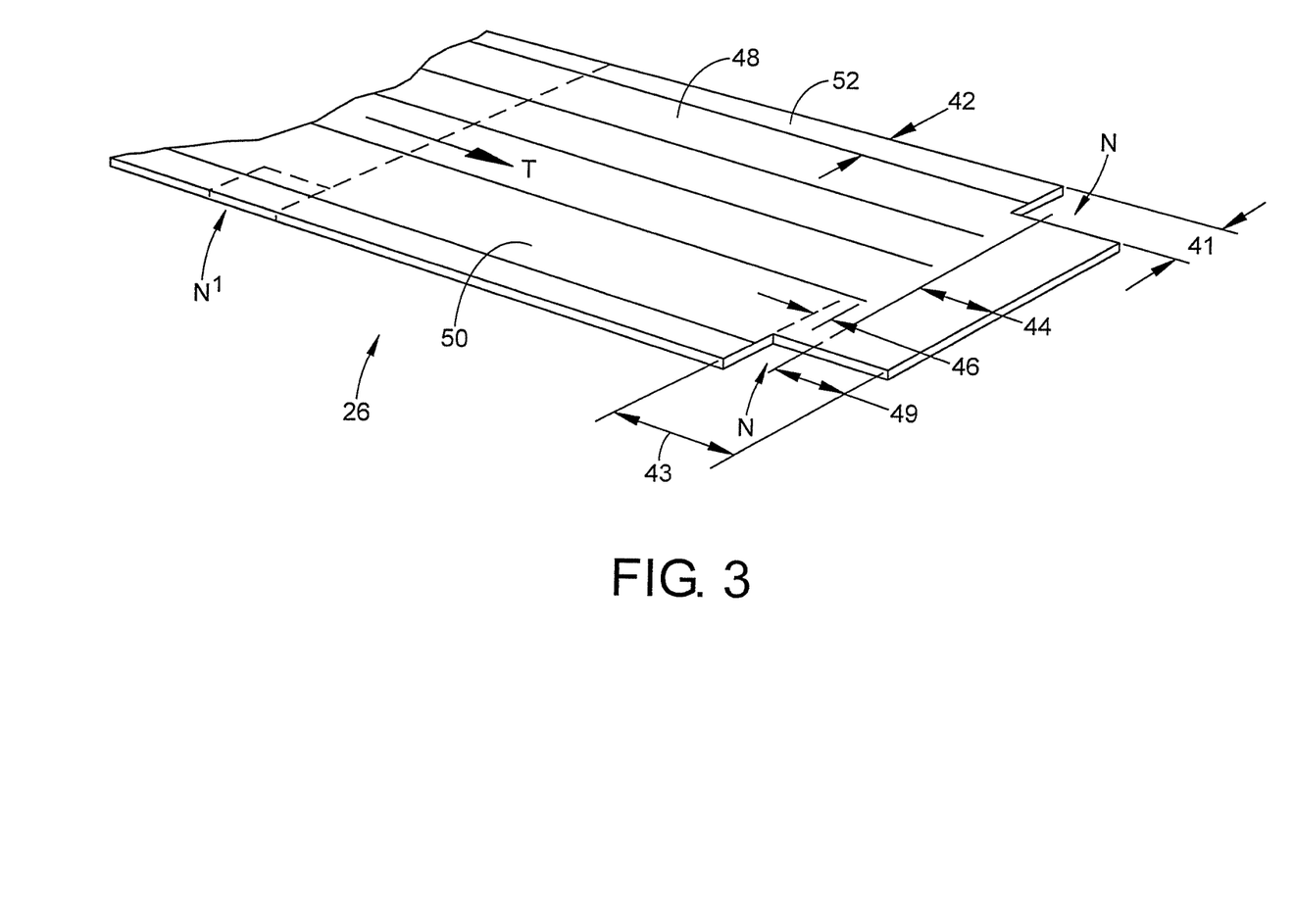
FIG. 3 is a perspective view of a metal strip with the edge trim notched in accordance with a preferred embodiment of the disclosure.

Referring now to FIG. 3, this results in the notching shear module also partially cutting mults 48 and 50. According to the preferred embodiment of the disclosure, notcher modules are used to reduce the width of the leading end of the strip, which allows the leading end to be not slit until the slitter arbors are closed to their final position, at some point in the notched zone. As the strip 26 travels in direction T, a notch depth or length 41 of notch N is established in a notch zone 43 of the strip. An uncut zone 44 of the strip 26 is formed because the slitter arbor gap 49 is too large to cut the strip. The cut zone 46 starts before the end of the notch N. By arranging the cuts this way, this action results in a notch N of strip that is cut away from each outer edge 52 of the strip. If necessary (but not required) by making successive cuts as the strip advances, each edge is then removed in a continuous fashion such as a trim width 42.

An alternate method of notching the strip would be to create a notch N' further from the leading end, for example, about 12 feet past the leading end (See FIG. 3). The leading end is not slit through, and the notches N' straddle the zone wherein the slitter arbors are closed from the unslit zone to the slit zone. The scrap chutes C would be positioned beyond the full width of the strip, and then as the notch zone is in the vicinity, the strip is stopped and the scrap chutes are positioned inwardly to catch the scrap. The scrap would be slit all the way through somewhere in the notch zone.

The two trimmed scrap edges are prevented from fouling on the scrap chutes that are close coupled to the exit side of the slitter. In any slitting line, scrap chopper chutes need to be close coupled to the exit of the slitter arbors otherwise the scrap system is not self-threading.

Figure 4:
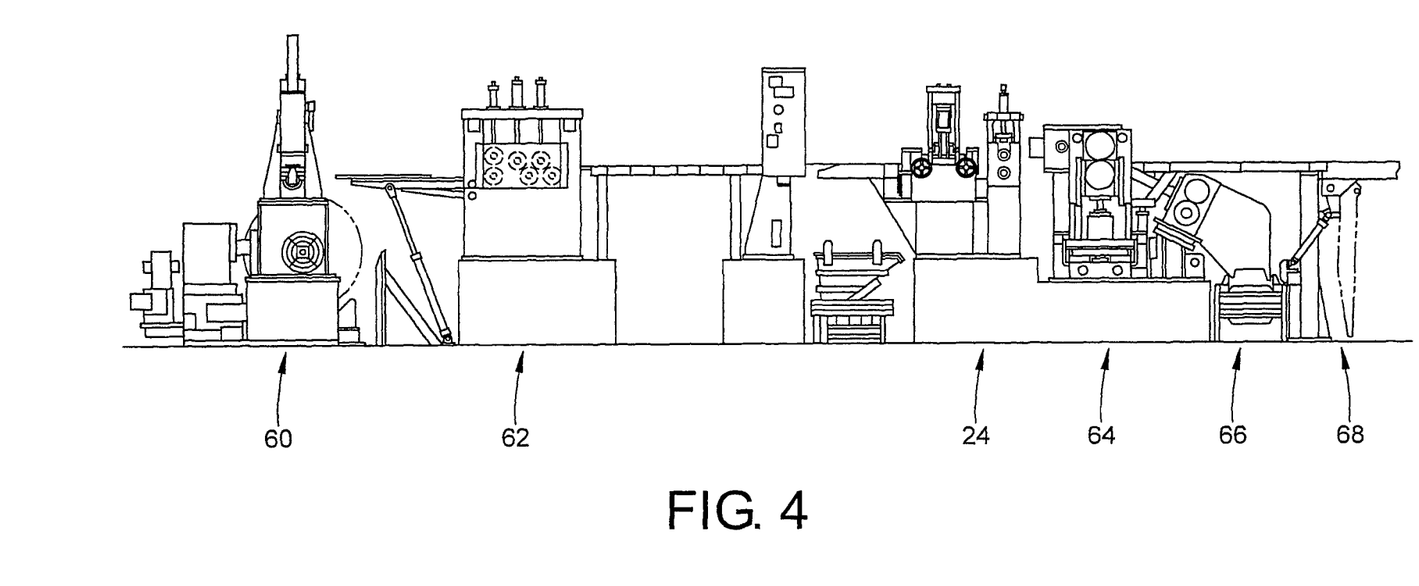
FIG. 4 is a side elevational view showing the entry end of a slitting line and proximity of the notching modules relative to the slitter in accordance with a preferred embodiment of the disclosure.
Figure 6:
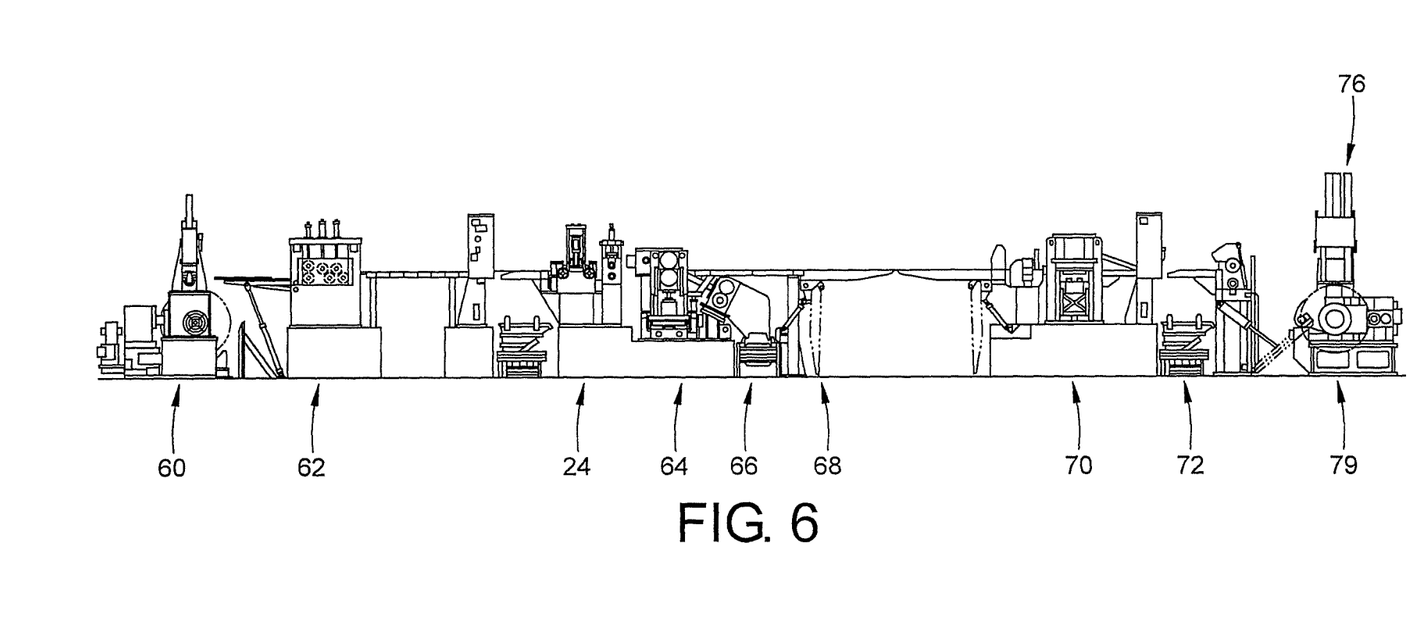
FIG. 6 is a side elevational view of a slitting line from uncoiler at the entry end to recoiler at the exit end.

Referring to FIGS. 4 and 6, an extensive slitting line layout is shown. In processing metal coils, both ferrous and non-ferrous, slitting lines are used to reduce the width of an incoming coil by cutting it into a series of narrow coils. At the entry end of the line a coil is mounted on a mandrel and unwound. The unwound material is referred to as "strip" 26. The leading edge of the strip is passed through a slitting machine that slices the strip longitudinally into multiple widths (these portions are often referred to as "mults") that are then rewound on a recoiling mandrel. The mults are then discharged and dealt with as individual narrow coils. The number of mults can vary from as little as two to as many as thirty or more.

Referring to FIGS. 4 and 6, an uncoiler 60 uncoils the sheet or strip 26 which enters a flattener with pinch rolls 62. The sheets pass by the notching shears 24 through slitter 64 and scrap chopper 66 and scrap conveyer 68. The strip then passes through straightener 70 to a strip cart 72 and to exit rollers 74 of recoiler 79. The slitter arbors 28, 29 close while the strip 26 is moving. This relates to the ratio of the rate of arbor closure vs. strip travel and is can be implemented as an automatic sequence controlled by the operator.

The notching shear modules 24 are positioned axially based on the width of the incoming strip 26 just ahead of the slitter arbors 28, 29.

Each notching module 24 has a pair of notching shear knives 30, 32 which have three sides S1, S2, S3, two of which have cutting edges for making a two sided cut; one cut is substantially parallel to the direction of strip travel of the strip while the other cut is relatively perpendicular to strip travel resulting in each notching shear module also cutting into its respective outermost mult.

During plunge slitting, when the leading edge of the strip 26 is threaded into the nip of the slitter arbors 28, 29, the slitter knife gap G is too large to cut the strip into mults; and the leading edge (for example the first 12 inches of strip) has a reduced width as reduced by the two notches N. Because the leading edge of the strip is narrower, and as the strip is advanced past the scrap chutes C (that are immediately downstream of the slitter arbors) there is no fouling of the strip edges on the scrap chutes.

When the leading edge of the strip 26 is at the nip of the slitter arbors, the arbor gap G is commanded to close at a predetermined rate while the strip 26 advances (continues to feed past the slitter) at an appropriate line speed, such that by the time the notch zone trailing edge is near the nip of the slitter arbors, the slitter arbor vertical gap G has closed to a point where the knife 20 vertical gap is tight enough to cut through the strip. This can be a fully automated sequence or can be manual with the operator controlling the sequence. The key is the timing between the vertical closure of the arbors and the speed of advance of the strip.

As the arbor gap G closes it is important for the strip 26 to be advancing otherwise the separating force between the arbors 28, 29 would get quite large and possibly overload the slitter arbor bearings.

As strip material 26 is fed into the line the slitter arbor gap G is preset too large to make the cut (i.e., during initial threading through the slitter). When the leading edge of the strip is at the notching shears 24 (which are located several feet upstream of the slitter), the notching shears are engaged and each shear cuts the edge trim for each edge. This can be done as a single cut or several cuts can be made in succession to create a relatively long reduced width at the leading end of the strip. Typically the notching will have been completed prior to the leading strip edge advancing far enough to be at the slitter. Generally it is desirable to keep the notched length short; this to reduce waste of material. As the strip 26 advances to the slitter, the slitter arbors are closed further at a closure speed that is appropriate to the strip advance speed. When strip has advanced far enough and slitter arbors 28, 29 are at their final cutting gap the strip will be cut all the way through and the strip width will be at the unnotched width, which results in each edge have a trim width that will 'automatically" thread itself into the scrap chutes C and on into the scrap choppers B or down to scrap winders.

During plunge slitting, the slitter knife gap is too large to cut the strip into mults. This continues for a distance slightly shorter than the notch length 41, at that point, the arbors are closed (i.e., plunged) sufficiently to cut through the strip. The closing of the arbors 28, 29 takes place while the strip is advancing, and must be completed prior to the notch zone passing entirely beyond the nip of the slitter arbors. It is important that the arbors are at the cutting gap prior to running out of the notch length, otherwise the trimmed edges will not thread down into the scrap chutes.

The disclosure has been described with reference to a preferred embodiment. Obviously, modifications and alterations may occur to others while reading and understanding the preceding detailed description. It is intended that the disclosure includes all such modifications and alterations insofar as they come within the scope of the preceding description and appended claims.

The invention claimed is:

1. A method of using notching modules with a slitting machine comprising:
   providing a slitting machine for threading a strip of material having first and second arbors;
   providing rotary knives disposed on each of first and second arbors, wherein said first and second arbors have a gap between them so said rotary knives do not initially cut said strip;
   providing a pair of notching modules positioned on opposite ends of said first and second arbors;
   providing a pair of opposed shear knives for each of said notching modules;
   making multiple cuts in an associated strip of material by pivoting one of said shear knives towards the other of said shear knives and said strip of material passing through said slitting machine with said shear knives;
   forming a notch in a lead end of said strip of material with a first cut parallel to strip travel and a second cut perpendicular to strip travel; and,
   wherein said first and second arbors are moved towards each other while the associated strip travels through the slitting machine so that said gap formed between said first and second arbors is small enough so that the rotating knives cut through said strip of material, including a trim width of said strip of material.

2. The method of claim 1, wherein said first and second arbors are adjustable to change a gap between said first and second arbors.

3. The method of claim 1, wherein a scrap chopper and chute are positioned at an end of said slitting machine.

4. The method of claim 1, further comprising:
   providing a hydraulic cylinder to pivot said shear knives.

5. A slitting machine for threading scrap material from an associated strip of material comprising:
   a first arbor and a second arbor disposed on opposite sides of said associated strip of material;
   rotary knives disposed on each of said first and second arbors;
   a pair of notching modules positioned on opposite ends of said first and second arbors; said notching modules are operated via a hydraulic cylinder;
   wherein said notching modules each comprises a pair of shear knives wherein one of said shear knives is pivoted towards the other of said shear knives via said hydraulic cylinder for making multiple cuts in a lead end of said associated strip of material passing through said slitting machine thereby forming notches for reducing a width of said lead end of said associated strip of material; and
   said rotary knives are then moved into contact with said associated strip of material to cut through said associated strip of material including a trim width of said associated strip of material.

6. The slitting machine of claim 5, whereas spacers are positioned between said rotary knives.

7. The slitting machines of claim 6, wherein sleeves are placed over said spacers.

8. The slitting machines of claim 5, wherein said arbors are adjustable to change a gap between said first and second arbors.

9. The slitting machine of claim 8, wherein said gap between said first and second arbors is closed while the associated strip travels through the slitting machine so that a gap between said rotating knives is small enough so that the rotating knives cut through said strip.

10. The slitting machine of claim 5, wherein said shear knives of said notching modules each have three sides of which two sides have cutting edges for making a two sided cut in said associated strip of material.

11. The slitting machine of claim 10, wherein said two sides of said shear knives make a first cut in said associated strip of material which is substantially parallel to the direction of strip travel and a second cut in said associated strip of material which is substantially perpendicular to strip travel.

12. The slitting machine of claim 11, wherein a notch is formed on a side of said associated strip of material via said first cut in said associated strip of material and via said second cut in said associated strip of material.

13. The slitting machine of claim 12, wherein after said notch is formed, a gap formed between said first arbor and said second arbor is reduced to be small enough to begin cutting a trim width of the associated strip of material.

14. The slitting machine of claim 5, wherein a scrap chopper and chute are positioned at an end of said slitting machine.

* * * * *